US006684222B1

(12) United States Patent
Cornelius et al.

(10) Patent No.: US 6,684,222 B1
(45) Date of Patent: Jan. 27, 2004

(54) METHOD AND SYSTEM FOR TRANSLATING DATA ASSOCIATED WITH A RELATIONAL DATABASE

(75) Inventors: Shawn S. Cornelius, Strangsville, OH (US); Arnold Z. Huffman, Chicago, IL (US); Matthew C. Klug, Hudson, OH (US); Richard R. Krahn, North Lake Elmo, MN (US); Eric C. Su, Foster City, CA (US); Michael S. Sweeney, Parma Heights, OH (US)

(73) Assignee: Accenture LLP, Chicago, IL (US)

( * ) Notice: Subject to any disclaimer, the term of this patent is extended or adjusted under 35 U.S.C. 154(b) by 287 days.

(21) Appl. No.: 09/710,132

(22) Filed: Nov. 9, 2000

(51) Int. Cl.$^7$ .............................................. G06F 17/30
(52) U.S. Cl. .................................. 707/104.1; 715/513
(58) Field of Search ............................ 707/102, 104.1, 707/100, 101; 715/513

(56) References Cited

U.S. PATENT DOCUMENTS

| | | |
|---|---|---|
| 5,331,579 A | 7/1994 | Maguire et al. ................. 703/2 |
| 5,613,122 A | 3/1997 | Burnard et al. .............. 709/321 |
| 5,630,131 A | 5/1997 | Palevich et al. ............. 717/108 |
| 5,642,511 A | 6/1997 | Chow et al. .................. 717/105 |
| 5,655,118 A | 8/1997 | Heindel et al. .......... 707/103 R |
| 5,664,177 A | 9/1997 | Lowry ......................... 707/100 |
| 5,737,559 A | 4/1998 | Orton et al. .................. 345/807 |
| 5,812,995 A | 9/1998 | Sasaki et al. .................... 707/1 |
| 5,838,965 A | 11/1998 | Kavanagh et al. ....... 707/103 R |
| 5,842,213 A | 11/1998 | Odom et al. ................. 707/100 |
| 5,945,992 A | 8/1999 | Cunniff ....................... 345/748 |

OTHER PUBLICATIONS

Malaika, S., "Using XML in Relational Database Applications", *Data Engineering, 1999, Proceedings 15$^{th}$ International Conference*, p. 167 (1999), Abstract.

Baru, C., "Xviews: XML Views of Relational Schemas", *Database and Expert Systems Applications, Proceedings, Tenth International Workshop*, pp. 700–705 (1999).

Bourret, R., et al., "A Generic Load/Extract Utility for Data Transfer Between XML Documents and Relational Databases", *Advanced Issues of E–Commerce and Web–Based Information Systems, Second International Workshop*, pp. 134–143 (2000).

Surjanto, B., et al., "Content Management Based on Object–Relational Database Technology", *Web Information Systems Engineering, Proceedings of the First International Conference*, pp. 70–79 (2000).

Using the MQSeries Integrator Version 1.0 dated May 1999, Wackerow et al. (205 pages).

IBM Opens MQSeries with XML http://www.techweb.com/wire/story/TWB19990614S0016 dated Jun. 14, 1999, Booker (3 pages).

IBM bolsters MQSeries with Java and XML http://www.n-wfusion.com/news/1999/0615java2.html dated Jun. 15, 1999, Cox (6 pages).

*Primary Examiner*—Jack M. Choules
(74) *Attorney, Agent, or Firm*—Brinks Hofer Gilson & Lione

(57) ABSTRACT

A method and system for preparing hierarchical textual file for storage in a relational database allows the user to use readily available commands for querying and manipulating stored in a relational database. A generally tabular data structure contains data attribute fields associated with corresponding data element fields. Hierarchical textual file is accepted containing structured data elements. The data attributes are determined. The data attributes are associated with corresponding structured data elements of the accepted hierarchical textual file. The determined data attributes are stored in the generally tabular data structure of the relational database.

15 Claims, 7 Drawing Sheets

| RELATIONAL DATABASE 49 | 48 68 | 50 68 | 52 68 | 54 68 | 56 68 |
|---|---|---|---|---|---|
| DATA ELEMENT | NODE IDENTIFIER | PARENT NODE IDENTIFIER | TAG | VALUE | FIELD TYPE |
| 58— FIRST DATA ELEMENT | DATA (E.G.,0) | DATA (E.G.,A) | XML | X | ALPHANUMERIC |
| 59— SECOND DATA ELEMENT | DATA (E.G.,1) | DATA (E.G.,A) | XML | $500 | NUMERIC (MONETARY) |
| 60— THIRD DATA ELEMENT | DATA (E.G.,2) | DATA (E.G.,A) | XML | 10 DAYS | ALPHANUMERIC |
| 61— 70— FOURTH DATA ELEMENT | DATA (E.G.,0) | DATA (E.G.,B) | XML | Y | ALPHANUMERIC |
| 62— FIFTH DATA ELEMENT | DATA (E.G.,1) | DATA (E.G.,B) | XML | $250 | NUMERIC (MONETARY) |
| 63— SIXTH DATA ELEMENT | DATA (E.G.,0) | DATA (E.G.,C) | XML | Z | ALPHANUMERIC |
| 64— SEVENTH DATA ELEMENT | DATA (E.G.,1) | DATA (E.G.,C) | XML | DISCONTINUED | ALPHANUMERIC |
| 65— NTH DATA ELEMENT | DATA | DATA | DATA | DATA | DATA |

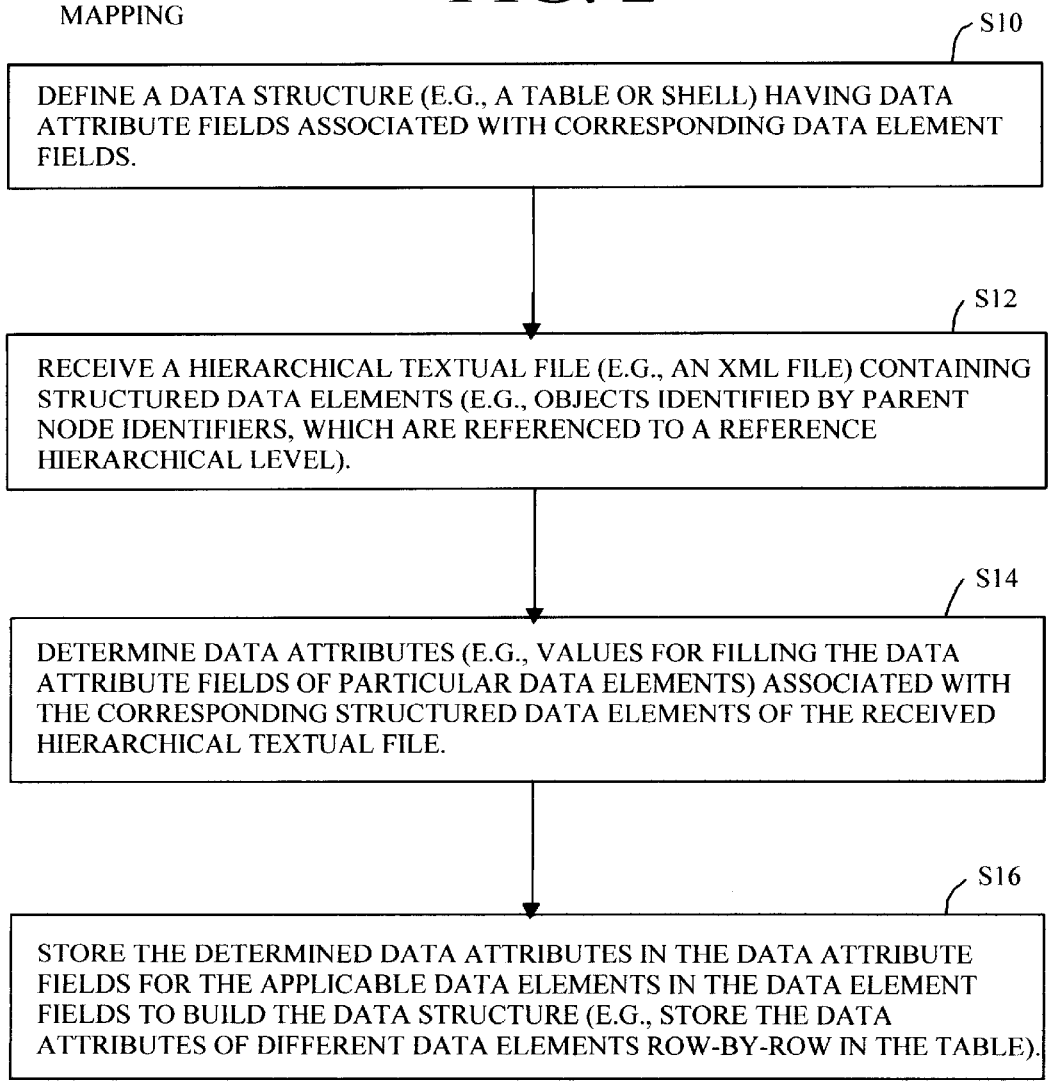

FIG. 6

| RELATIONAL DATABASE | NODE IDENTIFIER | PARENT NODE IDENTIFIER | TAG | VALUE | FIELD TYPE |
|---|---|---|---|---|---|
| DATA ELEMENT | | | | | |
| FIRST DATA ELEMENT | DATA (E.G.,0) | DATA (E.G.,A) | XML | X | ALPHANUMERIC |
| SECOND DATA ELEMENT | DATA (E.G.,1) | DATA (E.G.,A) | XML | $500 | NUMERIC (MONETARY) |
| THIRD DATA ELEMENT | DATA (E.G.,2) | DATA (E.G.,A) | XML | 10 DAYS | ALPHANUMERIC |
| FOURTH DATA ELEMENT | DATA (E.G.,0) | DATA (E.G.,B) | XML | Y | ALPHANUMERIC |
| FIFTH DATA ELEMENT | DATA (E.G.,1) | DATA (E.G.,B) | XML | $250 | NUMERIC (MONETARY) |
| SIXTH DATA ELEMENT | DATA (E.G.,0) | DATA (E.G.,C) | XML | Z | ALPHANUMERIC |
| SEVENTH DATA ELEMENT | DATA (E.G.,1) | DATA (E.G.,C) | XML | DISCONTINUED | ALPHANUMERIC |
| ... | ... | ... | ... | ... | ... |
| NTH DATA ELEMENT | DATA | DATA | DATA | DATA | DATA |

…

METHOD AND SYSTEM FOR TRANSLATING DATA ASSOCIATED WITH A RELATIONAL DATABASE

FIELD OF THE INVENTION

The invention relates generally to a method and system for translating data between a hierarchical data structure and a generally tabular data structure for storage in a relational database.

BACKGROUND

A data processing system, such as a server, may be connected to a communications network, such as the Internet. The data processing system may communicate with another data processing system coupled to the communications network by using an open, dynamically-defined data structure such as Extensible Mark-up Language (XML). XML refers to a data structure or convention for organizing structured data within hierarchical textual file.

XML provides a set of rules and guidelines that promote the exchange of data between data processing systems regardless of platform differences or other local variations in the underlying data processing systems. XML is a subset of the International Standards Organization (ISO) Standard, Generalized, Mark-up Language (SGML), which is simplified for operation over the Internet. Both SGML and XML provide a standard document format language that enables a publisher to establish a standard document that can be exchanged, viewed, displayed, or printed in an assortment of different ways.

Although XML supports interoperability between different data processing systems, XML documents are generally difficult to query for information if the XML documents are stored in a database. A group of objects within a database or file (e.g., XML document) may be related in a defined manner. Accordingly, new objects can be created or added to the database in an expedited manner because the new objects can be derivatively defined from the existing objects. For example, one object can inherit characteristics from another object within the database. Restricted actions are applicable to particular types of objects, which may contain data responsive to a query. The foregoing inter-relationships between objects in the database and functional restrictions applicable to objects can make searching and retrieval of hierarchical documents in a database complex, cumbersome, and protracted.

To improve the data retrieval performance of databases, some software designers have developed specialized mapping architectures to allow XML documents to be mapped into a relational database for limited applications. However, the specialized mapping architecture is cumbersome because the architecture is usually based on custom database translation tables that are specific to a particular customized XML format, rather than the general XML standard. To a large extent the specificity of the custom database tables defeats the purpose of using an open, dynamically defined data structure, such as XML, in the first place. Thus, a need exists for a general or universally applicable procedure for preparing hierarchical textual file (e.g., XML document) for storage in a relational database.

SUMMARY OF THE INVENTION

In accordance with the invention, a method and system for translating data between a hierarchical data structure and a generally tabular data structure facilitates storing data representative of the hierarchical data structure in a relational database. If the hierarchical textual file is translated into a generally tabular data structure for storage in the relational database, a user may apply readily available commands for querying and manipulating the data in the relational database. If the data is translated into a hierarchical data format from the generally tabular structure in relational database, the hierarchical data may be transmitted over a communications system in a robust manner where the relational database acts as a backup repository of the transmitted data. A generally tabular data format contains data attribute fields and data element fields. A hierarchical textual file is accepted containing structured data elements. Data attributes are determined for each structured data element. The determined data attributes for corresponding data elements are stored in the generally tabular structure of the relational database in accordance with the data element fields and data attribute fields.

BRIEF DESCRIPTION OF THE DRAWINGS

FIG. 2 is a flow chart of a method for preparing hierarchical textual file for storage in a relational database in accordance with the invention.

FIG. 6 is a generally tabular data structure (e.g., a table) that provides a representation of the hierarchical data structure of FIG. 5 for storage in a relational database in accordance with the invention.

DETAILED DESCRIPTION OF THE INVENTION

Figure 1A:
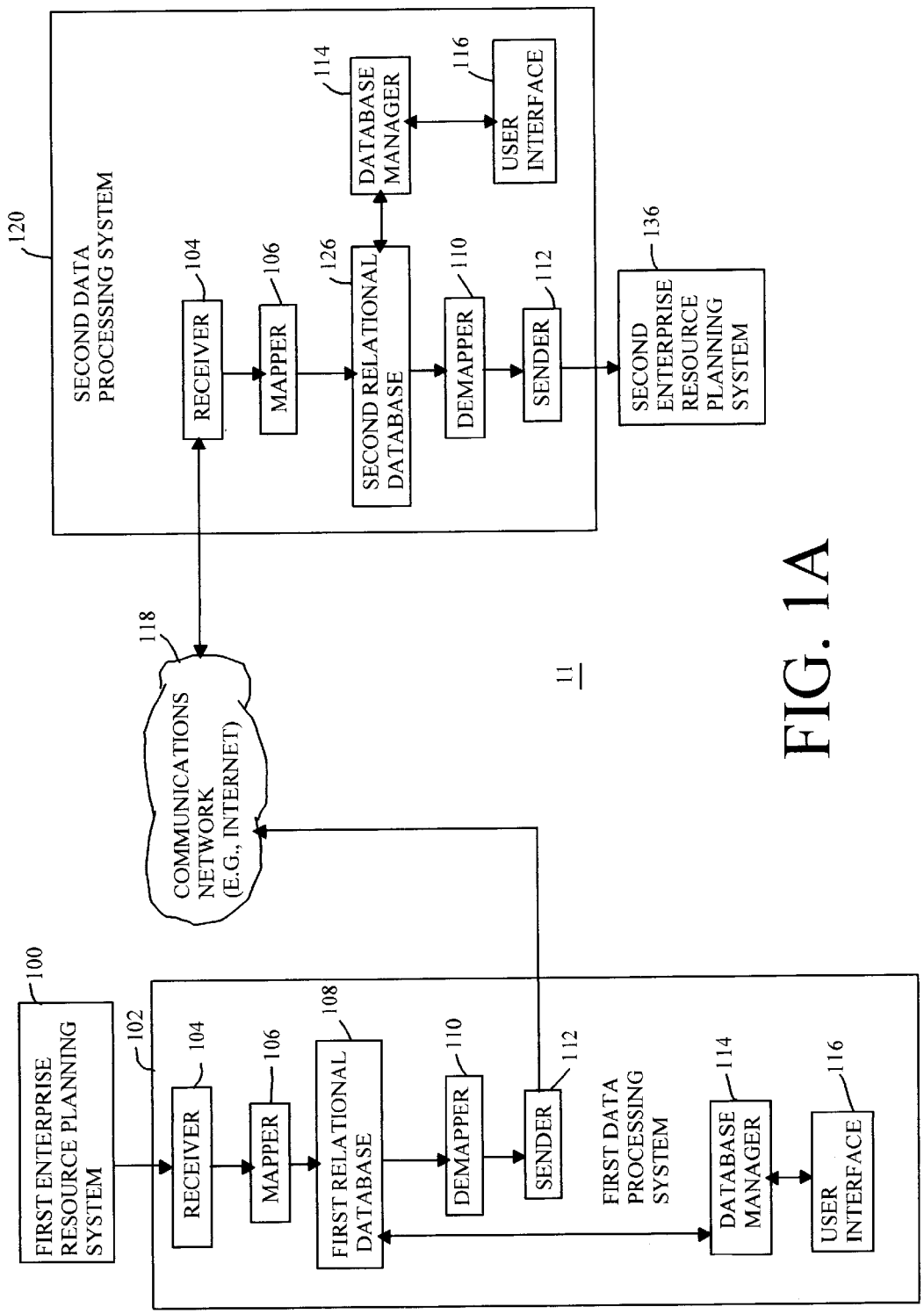
FIG. 1A is a block diagram of a data processing system for translating data between a hierarchical textual file and a generally tabular data structure in accordance with the invention.

FIG. 1A is a block diagram of a system 11 for translating data between a hierarchical data structure and a generally tabular data structure in accordance with the invention. The system 11 for translating data includes a first enterprise resource planning system 100 coupled to a first data processing system 102 at one site. At another site, the system 11 for mapping data includes a second data processing system 120 and a second enterprise resource planning system 136. The first data processing system 102 communicates with the second data processing system 120 via a communications network 118 (e.g., the Internet). The first data processing system 102 and the second data processing system 120 may act as intermediaries for the exchange of data between the first enterprise resource planning system 100 and the second enterprise resource planning system 136. In one embodiment, the first enterprise resource planning system 100 and the first data processing system 102 are associated with a first business entity, whereas the second enterprise resource planning system 136 and the second data processing system 120 are associated with a second business entity.

The first enterprise resource planning system 100 may generate transactional data or other data that may be exchanged with the second enterprise resource planning system 136 (or vice versa) to enhance a business relationship (e.g., customer-supplier relationship) between the first business entity and the second business entity.

In an alternate embodiment, the first enterprise resource planning system 100, the second enterprise resource planning system 136, or both may be replaced by one or more business management systems (e.g., purchasing systems, accounting systems, manufacturing systems, or otherwise).

The first data processing system 102 includes a receiver 104 that communicates with a mapper 106. In turn, the mapper 106 communicates with a first relational database 108 to facilitate the storage of data in the first relational database 108. The demapper 110 communicates with the first relational database 108 to facilitate retrieval of stored data from the first relational database 108. The demapper 110 communicates with a sender 112. The sender 112 may be coupled to the communications network 118 to send transactional data or other data originating from the first enterprise resource planning system 100 to the second enterprise resource planning system 136. A user interface 116 is coupled to the database manager 114. In turn, the database manager 114 is coupled to a first relational database 108.

The second data processing system 120 includes a receiver 104 that may be coupled to the communications network 118. The receiver 104 is in communication with a mapper 106. The mapper 106 communicates with the second relational database 126 to facilitate the storage of data in the second relational database 126. The demapper 110 communicates with the second relational database 126 to facilitate retrieval of information from the second relational database 126. The demapper 110 is in communication with the sender 112. A user interface 116 and a database manager 114 are coupled to the second relational database 126.

In the first data processing system 102, the receiver 104 receives transactional data or enterprise resource planning data from the first enterprise resource planning system 100. The received data may be expressed in a hierarchical data structure format, such as extensible mark-up language (XML). A hierarchical textual file refers to a hierarchical data structure that represents a data object or contains at least one data object. In general, a data object defines a data structure component having a data type and at least one data function. A data function is an operation that can be applied to the data structure component.

XML refers to a category of data objects called XML documents. Each XML document includes storage units called entities. Entities contain parsed data or unparsed data. Unparsed data only includes symbols. Parsed data includes symbols (e.g., characters) and markup code that provides a definition of the storage layout and logical structure of the XML document.

The mapper 106 converts the hierarchical data structure into a table or another generally tabular data structure for storage in the first relational database 108. The first relational database 108 supports storage and retrieval of information in the table or another generally tabular data structure. The user interface 116 may cooperate with the database manager 114 to allow querying, searching, and retrieval of the generally tabular data structure in the first relational database 108. The demapper 110 translates the generally tabular data structure or the information in the first relational database 108 into a hierarchical data structure (e.g., an extensible markup language (XML) document) for transmission over the communications network 118. The sender 112 sends a hierarchical data structure (e.g., XML document) from the first data processing system 102 to the second data processing system 120 via the communications network 118. The communications network 118 may apply secure socket layer or another encryption scheme to the XML document to provide secure and private communications.

In the second data processing system 120, the receiver 104 receives transactional data or enterprise resource planning data from the first enterprise resource planning system 100. The received data may be expressed in a hierarchical data structure format, such as extensible mark-up language (XML). The mapper 106 converts the hierarchical data structure format into a table or another generally tabular data structure for storage in the second relational database 126. The second relational database 126 supports storage and retrieval of information in the table or another generally tabular data structure. The user interface 116 may cooperate with the database manager 114 to allow querying, searching, and retrieval of the table in the second relational database 126. The demapper 110 translates the table or the information in the second relational database 126 into an extensible markup language data for transmission to the second enterprise resource planning system 136 or another business management system.

The sender 112 sends or transmits a hierarchical data structure (e.g., an extensible markup language document) from the second data processing system 120 to the second enterprise resource planning system 136 or another business management system. Although the first data processing system 102 may represent a source server and a second data processing system 120 may represent a destination server as shown, in an alternate embodiment, the first data processing system 102 and the second data processing system 120 may exchange hierarchical textual files in a bi-directional manner. The first data processing system 102, the communications network 118, and the second data processing system 120 cooperate to form a communications system. The first data processing system 102 of FIG. 1A realizes enhanced interoperability (e.g., platform and software independence) with the second data processing system 120 by transmission of readily interpretable, hierarchical textual file, such as XML document, over a communications network 118.

The first data processing system 102 may archive data from the first enterprise resource planning system 100 into a first relational database 108 for subsequent reference prior to transmission of the data over the communications network 118. Similarly, the second data processing system 120 may archive data from the second enterprise resource planning system 136 in a second relational database 126 prior to sending the data to a first enterprise resource planning system 100. The archived data in the first relational database 108 supports record-keeping, book-keeping and auditing of transactions between the first enterprise resource planning system 100 of a first entity and a second enterprise resource planning system 136 of a second entity. In one embodiment, the first relational database 108 and the second relational database 126 support recovery of transactional data, should communications fail or be interrupted between the first business entity and the second business entity via the communications network 118. For example, if the first data processing system 102 does not receive an acknowledgement or confirmation of receipt of data previously transmitted by the first data processing system 102 to the second data processing system 120, the first data processing system 102 may initiate a resend of the transactional data (e.g., miscommunicated or lost data). The applicable information is retrieved from the first relational database 108, as opposed to the first enterprise resource planning system 100, and transmitted to the second data processing system 120.

Users of the first business entity and the second business entity may query the first relational database 108 and the second relational database 126, respectively, to check for substantial identity or equivalence of the contents of the transactional data (e.g., as the generally tabular data structure) stored in the first relational database 108 and the second relational database 126. The first relational database 108 cooperates with a database manager 114 and a user interface 116 to support standard database queries. Similarly, the second relational database 126 cooperates with the database manager 114 to support standard database queries. If discrepancies between the first relational database 108 and second relational database 126 are discovered, the user of the first relational database 108 or the second relational database 126 may edit any erroneous information to conform to the correct database, after investigation or consultation with the applicable trading partner (e.g., the first business entity or the second business entity).

The database manager 114 interfaces with the first relational database 108 to support one or more of the following: storage of data in the first relational database 108, modification of data in the first relational database 108 and retrieval of data of the first relational database 108. Similarly, database manager 114 interfaces with the second relational database 126 to support one or more of the following: storage of data in the second relational database 126, modification of data in the second relational database 126 and retrieval of data of the second relational database 126.

The user interface 116 provides the user with a graphical user interface, a display, a keyboard or another input/output device for controlling the database manager 114, the first data processing system 102, or the second data processing system 120. For example, a user may enter a query in the user interface 116 to extract desired or sought information from the first relational database 108.

The database manager 114 may support one or more query languages. For example, the database manager 114 may interpret queries from the user interface 116, which are expressed in a standard or conventional query language. In a preferred embodiment, the database manager 114 supports a Structured Query Language (SQL). Structured Query Language and SQL was developed by International Business Machines Corporation. In an alternative embodiment, the database manager 114 supports a fourth generation or later generation query language for managing the first relational database 108 or second relational database 126. The first data processing system 102 enhances the data retrieval associated with XML documents by accessing XML-derived information from a first relational database 108 via a standard query language.

Figure 1B:
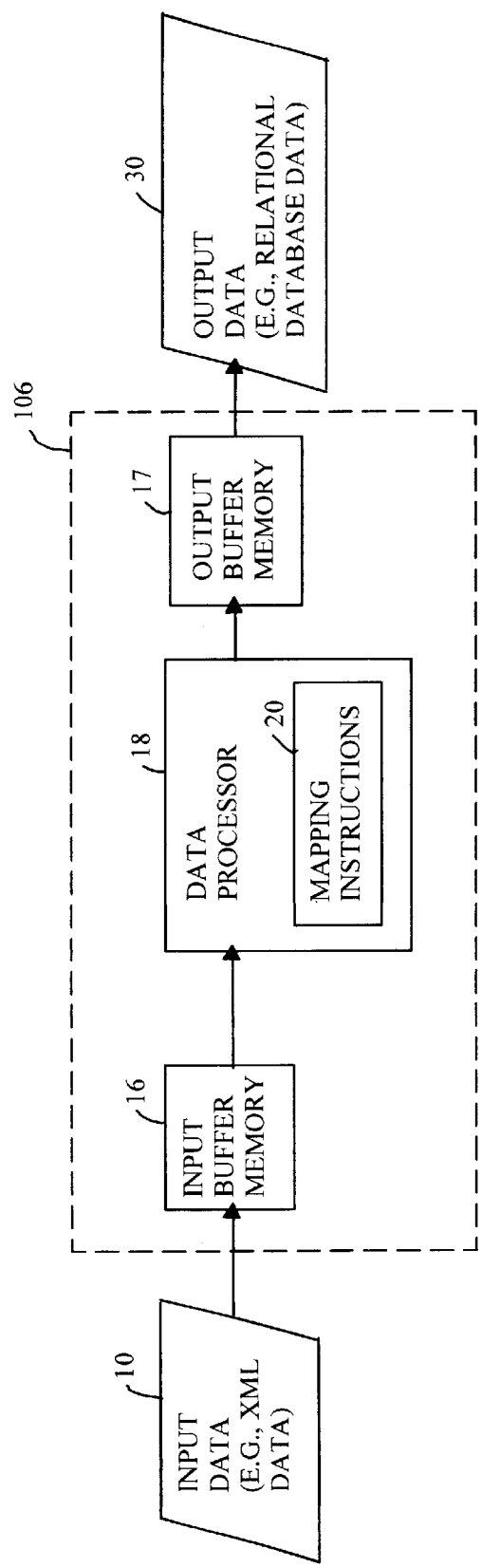
FIG. 1B is a block diagram of a mapper of FIG. 1A in accordance with the invention.

FIG. 1B shows one embodiment of the mapper 106 of FIG. 1A in greater detail. Like reference numbers indicate like elements in FIG. 1A and FIG. 1B. FIG. 1B shows the mapper 106 for preparing a hierarchical textual file for storage as a generally tabular data structure in a first relational database 108 or the second relational database 126.

The mapper 106 includes a input buffer memory 16 coupled to an input of a data processor 18 and output buffer memory 17 coupled to an output of a data processor 18. The input buffer memory 16 and the output buffer memory 17 may represent different memory allocations within one or more electronic memory devices (e.g., random access memory). The data processor 18 is associated with mapping instructions 20. Input data 10 (e.g., a hierarchical textual file or an XML data) is inputted into the mapper 106. As shown in FIG. 1A, the source of the input data 10 may comprise a first enterprise resource planning system 100 or another processing system communicating over a communications network 118, such as the Internet. The output data 30 (e.g., relational database data) can be transferred to the first relational database 108 or another relational database of the first processing system 102.

In one example, the input data 10 to the mapper 106 includes one or more hierarchical files (e.g., XML files). If each of the inputted hierarchical files is mapped or converted into a respective table (e.g., table 72 in FIG. 5) or another generally tabular data structure for storage in the first relational database 108 or second relational database 126. The relationships between the tables is expressed by the relative organization of the tables within the first relational database 108 or the second relational database 126. Each of the tables within the first relational database 108 or second relational database 126 may be readily queried in accordance with a query command or a standard query language.

FIG. 2 shows a flow chart of a method for preparing hierarchical textual file for storage as a generally tabular format in a first relational database 108 or second relational database 126. For example, the method of FIG. 2 illustrates the translation of a hierarchical textual file (e.g., an XML file) into a table for storage in a database. The method of FIG. 2 starts in step S10 and is described in conjunction with FIG. 1A and FIG. 6.

In step S10, a data processing system (102 or 120) defines a generally tabular data structure having data attribute fields associated with corresponding data element fields. The data element fields may contain data element identifiers for distinguishing different data elements from each other. The generally tabular data structure may be expressed as a table or a shell with an expandable number of data elements to accommodate a corresponding hierarchical textual file.

FIG. 6 shows a representative example of a table 72 that may be used to practice the method of FIG. 2. As shown in FIG. 6, the table 72 has data attribute fields 68 and data element fields 70. Data attribute fields 68 represent potential or actual characteristics of a corresponding data element. A data element represents a structured data component, an object component, or an object within the hierarchical textual file. A row of the table 72 may contain multiple data attributes and a corresponding data element field. FIG. 6 will be described in greater detail later.

In step S12 of FIG. 2, the data processing system (102 or 120) receives a hierarchical textual file containing structured data elements. For example, the data processing system (102 or 120) receives an XML document as the hierarchical textual file from one of the enterprise resource planning systems (100 or 136). The structured data elements may represent the entities of an XML file, where the entities are parsed or unparsed data. In one embodiment shown in FIG. 5, the structured data elements include objects 252 that are identified by parent node identifiers and any object components 258. The parent node identifiers are referenced to a reference hierarchical level 256. The first data processing system 102 may receive the hierarchical textual file from the first enterprise resource planning system 100, whereas the second data processing system 120 may receive the hierarchical textual file from the first data processing system 102 via the communications network 118.

Once the receiver 104 receives the hierarchical textual file (e.g., an XML file) for translation, the mapper 106 or translator preferably translates the hierarchical textual file starting from a beginning of the hierarchical textual file and proceeding toward an end of the hierarchical textual file in sequential order. The mapper 106 parses the data in the hierarchical textual file as necessary to fill entries in the table 72 or another generally tabular data structure.

In step S14, the data processing system (102 or 120) determines the data attributes associated with corresponding structured data elements of the received hierarchical textual file. To this end, the data processing system (102 or 120) reads the data elements of the accepted hierarchical textual file on an element-by-element basis to determine the values for filling the data attribute fields of particular data elements. After or during the reading, the data processing system 12 determines relationships or affiliations between data attributes and each corresponding data element. The data attributes include hierarchical relationship data (e.g., node identifier and parent node identifier) for defining a hierarchical data structure among or between different data elements. The data processing system (102 or 120) stops reading the hierarchical file once all structured data elements (e.g., entities) within the hierarchical textual file have been evaluated. Further, data values of the characteristics of the structured data elements are determined and classified into appropriate data attributes. In the context of handling a group of XML documents, step S14 represents a recursive process where an XML document hierarchy is looped through and structured data elements from each XML document are entered in one at a time into one or more tables 72. The table 72 is populated with entries (e.g., data attributes) until an entire hierarchical file is represented by one or more full tables.

In step S16, the data processing system (102 or 120) stores the data entries (e.g., data entries 66 in FIG. 5) or data values for the determined data attributes and corresponding data elements in the table 72 of the first relational database 108 or the second relational database 126. For example, the mapper 106 may store the determined data attributes in the data attribute fields 68 for the applicable data elements to build the table 72 or another generally tabular data structure. A data entry 66 may be placed at an intersection (e.g., a cell at the intersection of a column and a row) of a data attribute field 68 and a data element field 70 in the table 72. In one embodiment, the mapper 106 may store the data attributes of different data elements on a row-by-row basis in the table 72.

The hierarchical nature of the data of the hierarchical textual file is expressed in the table. For example, the hierarchical relationships between different data elements of the hierarchical textual file may be expressed as data elements associated with corresponding hierarchical relationship fields (e.g., node identifiers and parent node identifiers) as the data attribute fields 68. The table 72 or generally tabular data structure contains the necessary hierarchical information and data values for reconstructing the hierarchical textual file from which it was derived.

Figure 3:
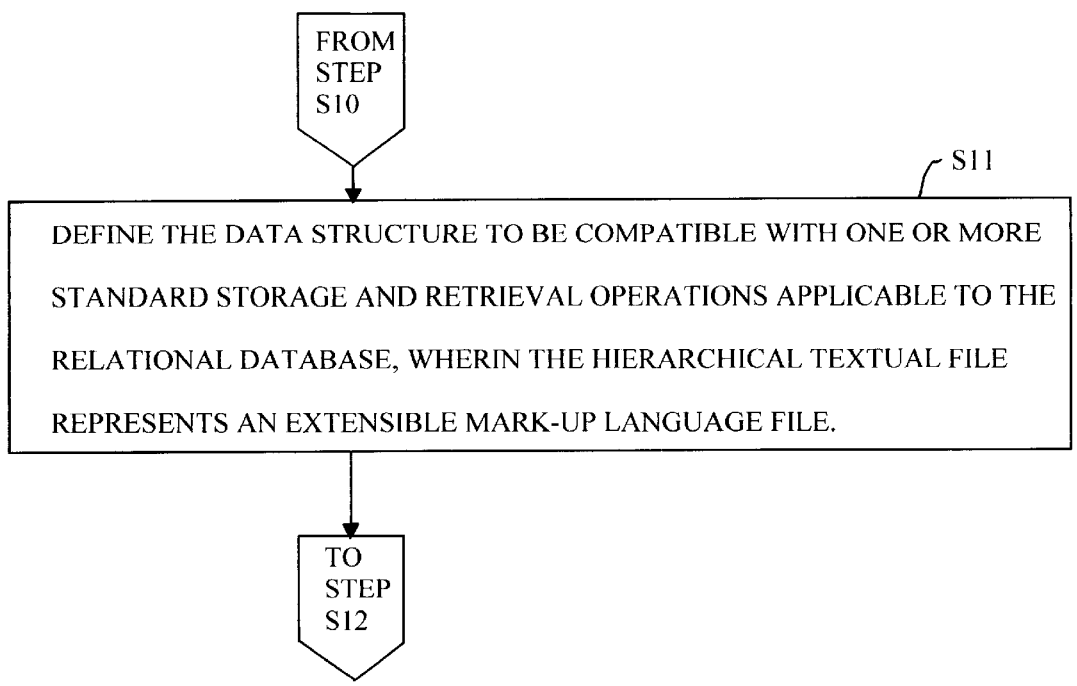
FIG. 3 shows an additional step that may supplement the procedure of FIG. 2.

FIG. 3 shows an additional step that may supplement the procedure of FIG. 2. FIG. 3 includes step S11 that may follow step S10 and precede step S12 in FIG. 2.

After step S10 in step S11, the processing system defines the generally tabular data structure (i.e., the table 72) to be compatible with one or more standard storage and retrieval operations applicable to a first relational database 108 or the second relational database 126. The data processing system (102 or 120) processes hierarchical textual file, such as an extensible mark-up language file, to allow XML-derivative information to be stored in the table 72 of the first relational database 108 or the second relational database 126.

In accordance with the invention, the method and system may be applied to prepare a hierarchical textual file for storage in a first relational database 108 or second relational database 126. The method and system advantageously allows any XML data structure to be stored in a generic storage procedure for a first relational database 108 or the second relational database 126. Because the XML structure may be readily transformed into a generic relational data storage format, which is referred to as a generally tabular data structure, the XML data may be queried and manipulated in a convenient manner using a standard query language, such as structured query language commands.

The processing system can restore a hierarchical file, such as XML document, by completing an inverse procedure to that illustrated in FIG. 2. For example, the processing system can retrieve a table from the first relational database 108 or the second relational database 126 and convert or restore the table into an XML document for transmission from the second data processing system 120 to the first data processing system 102.

Figure 4:
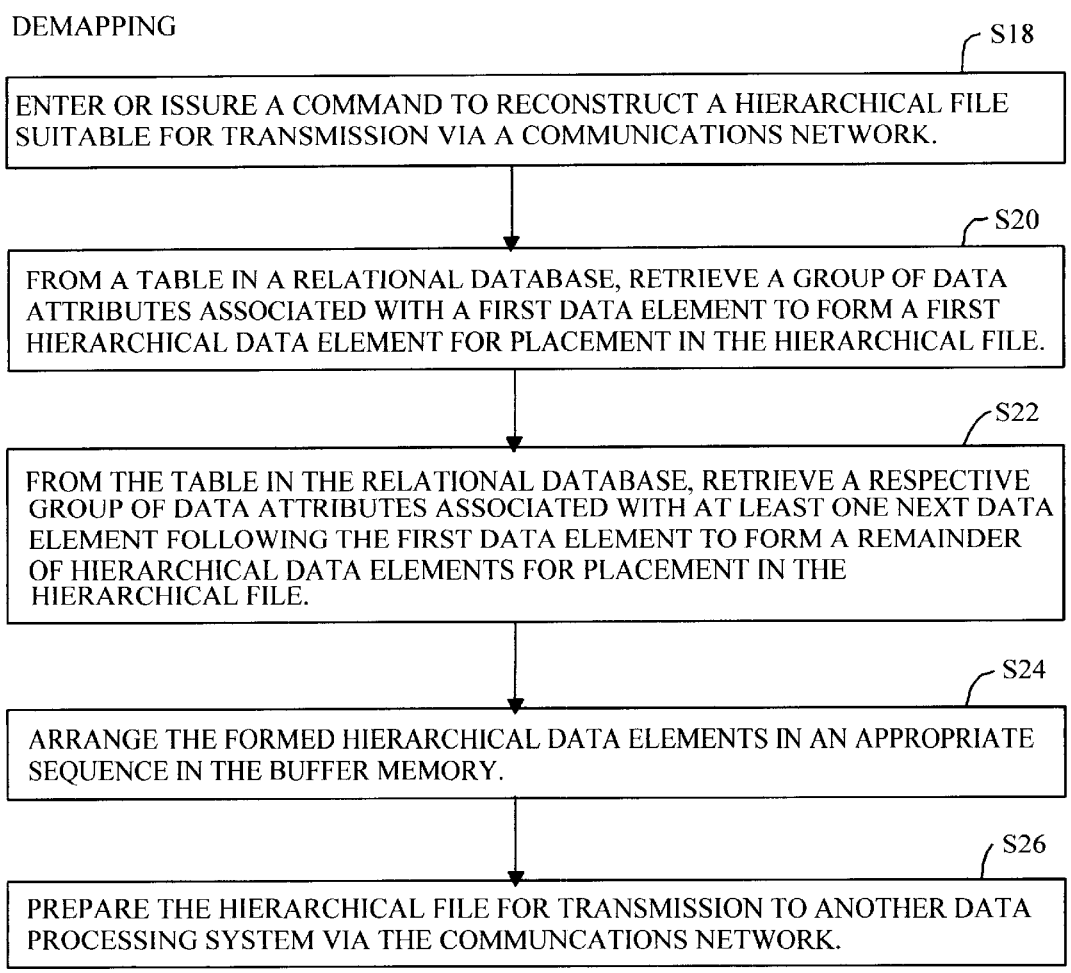
FIG. 4 is a flow chart of a method for deriving a hierarchical textual file from a generally tabular data structure in a relational database in accordance with the invention.

The reassembly of hierarchical textual file is illustrated in FIG. 4. The method of FIG. 4 starts at step S18 and is described in conjunction with FIG. 5.

In step S18, a user may enter a command from a user interface 116 to reconstruct a hierarchical file from a generally tabular data format (e.g., table 72) or a data processing system (102 or 120) may issue a command to reconstruct hierarchical file in the first relational database 108 or the second relational database 126. The reconstruction of the hierarchical file prepares the file for transmission to a remote data processing system (e.g., 102 or 120) via a communications network. Further, the reconstruction of the hierarchical file may support compatibility with an enterprise resource planning system (e.g., the second enterprise resource planning system 136). If the hierarchical file is an XML document and the communications network 118 is the Internet, then the transmission of the information as an XML document enables different business entities to gain interoperability in the exchange of the information in the XML document. The exchange of information in the XML file or another standardized hierarchical textual file enables business entities to communicate regardless of platform differences of their respective data processing systems (102, 120); and ultimately, their enterprise resource planning systems (100 or 136). Further, an XML file is somewhat tolerant of variances in nomenclature within the XML files originating from different trading partners (e.g., the first business entity and the second business entity).

In step S20, the demapper 110 retrieves a group of data attributes from generally tabular data structure (e.g., table 72) in the first relational database 108 or second relational database 126. The retrieved group of data attributes are associated with a first data element, in the first relational database 108 or second relational database 126, to form a first hierarchical data element for placement in the hierarchical file. A retrieved group of data attributes may be used to derive or determine the first hierarchical data element for placement in the hierarchical file under construction.

In the context of an XML file, the hierarchical data element refers to an entity (e.g., an object or an object component). The first data element refers to a first data element stored in the table or a generally tabular data structure. In an alternate embodiment, the first data element may refer to a last data element stored in the table.

In step S22, the demapper 110 retrieves a next group of data attributes from the table in the first relational database 108 or the second relational database 126. The next group of data attributes is associated with the next data element following the first data element until all of the data elements within the table have been considered. Each next data element and its associated attributes form a next hierarchical data element (e.g., entity) for placement in the hierarchical textual file (e.g., XML file). Each next group of data attributes may be used to derive or determine another corresponding hierarchical data element for placement in the hierarchical file under construction.

In step S24, simultaneously with steps S20 and S22 or thereafter, the demapper 110 arranges the hierarchical data elements in an output buffer memory. In one example, the data elements in the generally tabular data structure are stored in the same order or sequence as the corresponding hierarchical data elements of the hierarchical file. Accordingly, the first data element of the generally tabular data structure (e.g., table 72) represents a first data hierarchical data element of the hierarchical textual file (e.g., an XML file or file 250) and the last data element of the table represents the last hierarchical data element of the hierarchical textual file. In an alternative embodiment, the last data element of the table may represent the first data element of the hierarchical textual file, while the first data element of the table represents the last data element of the hierarchical file.

In the context of an XML file, entities of an XML file are reconstructed on a data element by data element basis in a staging memory area of the output buffer memory. The order of the data elements in the inputted table may be used to determine the order in which the entities appear in the outputted XML document.

In step S26, the sender 112 prepares hierarchical file for transmission to another data processing system (e.g., first data processing system 102 or the second data processing system 120) via a communications network (e.g., communications network 118). For example, the completed hierarchical file is stored in the buffer memory for transmission via a communications network to another data processing system or for additional data manipulation. Accordingly, the data processing procedure of the invention supports rebuilding of the XML document or another hierarchical file to attain communications inoperability between the first data processing system 102 and the second data processing system 120.

Figure 5:
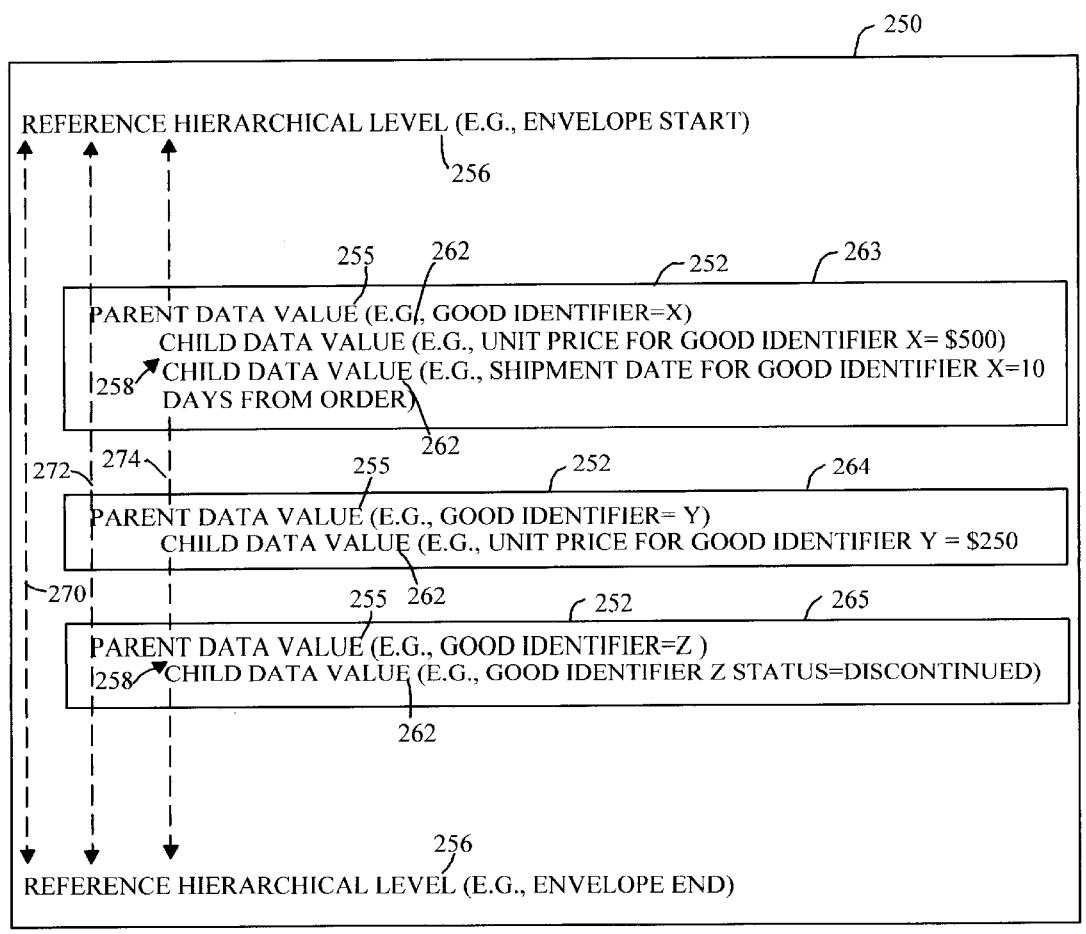
FIG. 5 is an illustrative example of a hierarchical data structure, such as XML, in accordance with the invention.

FIG. 5 is a diagram that illustrates a hierarchical textual file 250, such as extensible mark-up language file. Most or all data elements of the hierarchical textual file 250 may be related to a common reference hierarchical level 256. The relative degree of rightward indentation of the text of FIG. 5 from the left margin indicates different hierarchical levels that form a hierarchical reference framework within the hierarchical textual file 250. The relative degree of rightward indentation is illustrated by the relative separation between reference lines 270, 272, and 274, which are provided for explanatory purposes and are not typically included in a hierarchical textual file 250 during actual use.

The leftmost reference line 270 indicates the reference hierarchical level 256, or the highest hierarchical level upon which objects 252 within the hierarchical textual file 250 depend. The middle reference line 272 represents a hierarchical level less than the reference hierarchical level 256.

For example, the middle reference line 272 may represent an intermediate hierarchical level commensurate with a parent node. The rightmost reference line 274 represents a lower hierarchical level commensurate with a child node with respect to a corresponding parent node. If data elements are aligned with (e.g., left-justified to) the reference lines 270, 272, and 274, those data elements may take on the relative hierarchical levels indicated by the above reference lines.

The common reference hierarchical level 256 may be referred to as an envelope start and an envelope end. Parent nodes may be referenced to the reference hierarchical level 256. In one embodiment, the parent nodes may have equal hierarchical level, although in an alternate embodiment certain parent nodes may have different hierarchical levels with reference to the reference hierarchical level 256. Parent nodes may include parent data values 255. The mapper 106 may derive a parent node identifier for association with a corresponding parent data value to establish a generally tabular data structure. For example, the mapper 106 may derive a parent node identifier from the relative indentation of the data components and the order in which data components (e.g., objects 252) appear in the hierarchical textual file 250 to at least partially describe the hierarchical relationship of the data components within the hierarchical textual file 250.

The parent node identifiers may be used to identify objects 252. As shown in FIG. 5, one or more child nodes are related to each parent node. The child nodes may include child node data values 262. The mapper 106 may derive a child node identifier for association with a corresponding child node data value 262. For example, the mapper 106 may derive a child node identifier from the relative indentation or relative position of the data elements and the order in which the data elements appear in the hierarchical textual file 250 to at least partially describe the hierarchical relationship of the data elements within the hierarchical textual file 250.

In general, the hierarchical textual file 250 may contain one or more objects 252. Three objects 252 are shown in FIG. 5: a first object 263, an intermediate object 264, and a last object 265, where each object 252 is delineated by a separate box. A parent node identifier may identify each object so objects may be distinguished from one another. For example, the first object 263 may have parent node identifier A; the intermediate object 264 may have a parent node identifier B; and the last object 265 may have parent node identifier C, where FIG. 5 and FIG. 6 are consistent with each other in the definition of the parent node identifiers.

The first object 263 identified by parent node identifier A has two child nodes that are related to the parent node. The parent node may bear parent node identifier A and node identifier 0, whereas the child nodes have node identifiers, designated 1 and 2. The parent node identifier is associated with a parent data value 255. For example, the parent data value 255 of the first object 263 may indicate that a good identifier of a transaction is equal to X. The child node identifiers are associated with child node data values 262. For example, one child node data value of the first object 263 may indicate that unit price of the good identifier X is $ 500. Another child node data value of the first object 263 may indicate that the shipment date for the good identifier X is 10 days from date of receipt of a purchase order for the goods of good identifier X.

The intermediate object 264 in FIG. 5 is identified as parent node identifier B and node identifier 0. The child node is hierarchically defined with reference to the parent node B. The child node of the intermediate object 264 is designated by node identifier 1. The parent node identifier is associated with a corresponding parent data value 255. For example, a parent data value 255 of the intermediate object 264 may indicate that a good identifier of a transaction is equal to Y. The child node identifier 1 is associated with a child node data value 262. For example, a child node data value of the intermediate object 264 may indicate that unit price of the good identifier Y is $250.

The last object 265 in FIG. 5 is identified as parent node identifier C and node identifier 0. The child node is hierarchically defined with reference to the parent node C. The child node may be designated by a node identifier 1. The parent node identifier is associated with a corresponding parent data value 255. For example, a parent data value 255 of the last object 265 may indicate that a good identifier of a transaction is equal to Z. For the last object 265, the child node identifier 1 is associated with a child node data value 262 that indicates that the status of good identifier Z is discontinued.

Although FIG. 5 illustrates one example of a hierarchical textual file 250, an actual hierarchical textual file may contain declarations, data elements, comments, character references, processing instructions, or other data components that are arranged with the proper syntax consistent with an XML specification or otherwise. For example, each data element may include a start tag and end tag with character data positioned between the start and the end tag. The start tag and the end tag may indicate a property, type or characteristic of the character data.

FIG. 6 illustrates the three objects 252 of FIG. 5 after the mapper 106 maps the objects 252 into a generally tabular format, such as table 72, for storage in a relational database (e.g., the first relational database 108 and the second relational database 126). A generally tabular data structure may comprise a table with at least one column for data element identifiers, a column of data for defining a hierarchical relationship between data elements, and a column of data values for expressing the values of corresponding data elements. The hierarchical relationship data and data values represent examples of data attributes. At least one row of the table may represent an object or an object component of a hierarchical data structure. In one embodiment, each row of the table preferably represents an object component 258 in the hierarchical textual file 250.

Although other arrangements of tables may fall within the scope of the invention, the table 72 of FIG. 6 has a first column 49 that lists data element identifiers. Moving to the right from the first column 49, the second column 48 represents node identifiers of corresponding data elements. The third column 50 represents parent node identifiers of corresponding data elements. The fourth data column 52 represents a tag of a source format from which the contents of the table are derived. For example, the tag may refer to the source format of an XML document as shown. The fifth data column 54 indicates a data value for a corresponding data element identifier. The sixth column 56 represents a field type, which refers to a type of data in the data value. With respect to the data in the second column 48 through the sixth column 56 of FIG. 6, the foregoing data coincides with the values in the example of the hierarchical data structure or file 250 of FIG. 5.

In the example of FIG. 6 the data attribute fields 68 include a node identifier field in the second column 48, a parent node identifier field in the third column 50, a tag field in the fourth column 52, a value field in the fifth column 54, and a field type in the sixth column 56. In one arrangement of the table 72, the data attributes 68 include hierarchical relationship attributes, such as the node identifier (e.g., in the second column 48) and the parent node identifier (e.g., in the third column 50). The hierarchical relationship attributes support the definition of hierarchical relationships among the different data components and different data elements 70. Further, the hierarchical relationship attributes may be stored as linked lists in adjacent columns of the table, where different columns of the table are associated with different hierarchical levels (e.g., parent nodes versus child nodes) of data objects.

FIG. 6 shows an illustrative example of a table 72 that may be formed consistent with step S10 and step S16 of FIG. 2. A table 72 may be based on data from one or more hierarchical textual files (e.g., XML documents). Each hierarchical textual file may be evaluated on a data component-by-component basis until all of the data components within each hierarchical textual file within the hierarchy have been considered. The first column 49 indicates the data elements 70 in FIG. 6. The first column 49 shows a first data element 58 through an nth data element 65, inclusive, where n is any positive integer. The data attribute fields 68 are shown in the top row of FIG. 6.

The table 72 preferably stores a data entry or value for each distinct combination or a cell formed by an intersection of at least one data attribute field 68 and a corresponding data element field 70. For example, the first data element 58 may include data entries for the node identifier in the second column 48, the parent node identifier in the third column 50, the tag in the fourth column 52, the value in the fifth column 54 and the field type in the sixth column 56. Similarly, the second data element 59 may include data entries for the node identifier in the second column 48, the parent node identifier in the third column 50, the tag in the fourth column 52, the value in the fifth column 54, and the field type in the sixth column 56.

The second column 48 and the third column 50 of the table 72 are allocated to the node identifiers and parent node identifiers, respectively. The mapper 106 may assign the node identifier in the second column 48 as a sequence (e.g., an ascending or descending series of numbers) to identify the order of appearance or another hierarchical aspect of data elements in a respective object 252 of a hierarchical textual file 250. Similarly, the mapper 106 may assign the parent node identifiers, for a single hierarchical textual file 250, as a sequence (e.g., an ascending alphabetical sequence of letters) to identify the order of appearance of the objects 252 in the hierarchical textual file 250.

The parent node in the third column 50 identifies a position of a data element in a hierarchy (e.g., with reference to a reference hierarchical level 256) associated with at least one hierarchical textual file (e.g., file 250). The tag in the fourth column 52 identifies hierarchical textual file for the data. The value in the fifth column 54 identifies a data value for a corresponding tag. The field type in the sixth column 56 identifies the data type, where a value based on a definition of a data type or format (e.g., alphanumeric, text, numeric, numeric, or monetary) is used. The mapper 106 reads the hierarchical textual file 250 to extract or determine the appropriate data values for the tag, value, and field type for a respective data element.

Although the data attribute fields 68 include a node identifier field in the second column 48, a parent node identifier field in the third column 50, a tag field in a fourth column 52, a value field in a fifth column 54, and a field type in a sixth column 56 as shown in FIG. 6, in an alternate embodiment the definitions or arrangement of data attribute fields may differ from that shown. Further, FIG. 6 does not impose any limitation upon the number of rows or columns within the table 72. Although table 72 is illustrated as a two-dimensional table, a multidimensional table may be substituted for table 72 in an alternative embodiment.

The hierarchical textual file (e.g., file 250) allows interoperability between different data processing systems such as the first data processing system 102 and the second data processing system 120. Interoperability is promoted by a set of guidelines which is flexible enough to allow the interpretation and communication between the first data processing system 102 and the second data processing system 120 where one or more of the following are present: (1) differences in operating systems between the first processing system 102 and the second processing system 120; (2) variances in the transmitted data structure consistent with a standard applicable to an object oriented hierarchical textual file; and (3) differences in a computer platform of the first data processing system 102 and the second data processing system 120. The hierarchical textual file is suitable for transmission over the communications network 118 from the first data processing system 102 to the second data processing system 120, or vice versa. The method and system of the invention supports efficient communications of hierarchical textual files, while promoting efficient querying operations of the relational database.

A data message is transmitted between a first data processing system 102 and a second data processing system 120 over the communications network 118. The data message may contain a hierarchical textual file or a portion thereof. The data message may occupy virtually any number of data element positions or rows in the table 72. A hierarchical textual file may be represented by as few as one table, although in an alternate embodiment more than one XML file may be stored in a single table, where a file identifier column is included as a data attribute in the table.

A resultant relational database stores the generally tabular data structure and is well suited for supporting standard commands to retrieve, store, or modify data within the generally tabular data structure. Accordingly, Extensible Mark-up Language (XML) documents may be readily mapped into the relational database to capture the advantages of the interoperability of the XML language over the Internet, the convenience of standard querying languages, and the performance of standard querying language. The user may access the relational database to verify transactional data between trading partners.

The foregoing description of the method and system describes several illustrative examples of the invention. Modifications, alternative arrangements, and variations of these illustrative examples are possible and may fall within the scope of the invention. Accordingly, the following claims should be accorded the reasonably broadest interpretation, which is consistent with the specification disclosed herein and not unduly limited by aspects of the preferred embodiments disclosed herein.

What is claimed is:

1. A method for preparing a hierarchical textual file for storage in a relational database, the method comprising the steps of:
   defining a generally tabular data structure containing data attribute fields and data element fields, wherein the defining step includes storing hierarchical attributes as linked lists in columns of the table, different rows of the table associated with different levels of a hierarchy of data objects; at least one row of the table representing one object of data in the hierarchy of the data objects;
   accepting a hierarchical textual file containing structured data elements; and
   determining the data attributes associated with corresponding structured data elements of the accepted hierarchical textual file; and
   storing the determined data attributes in the generally tabular data structure of the relational database to preserve a hierarchical aspect of the hierarchical textual file.

2. The method of claim 1 wherein the defining step comprises defining the data structure to be compatible with standard storage and retrieval operations applicable to the relational database, the hierarchical textual file comprising an Extensible Mark up Language file.

3. The method according to claim 1 further comprising the step of querying the table of the relational database with a standard Structured Query Language command.

4. The method according to claim 1 further comprising the step of manipulating the table of the relational database with a standard Structured Query Language command.

5. The method of claim 1 wherein the defining step further comprises establishing a column of the table with the data attribute fields and rows of the table with the data element fields ranging from a first data element to an nth data element.

6. The method of claim 2 wherein the defining step includes specifying a node identifier as one of the data attribute fields, the node identifier identifying an order of a particular data element with respect to other data elements in the Extensible Mark up Language file.

7. A method for preparing a hierarchical textual file for storage in a relational database, the method comprising the steps of:
   defining a generally tabular data structure containing data attribute fields and data element fields;
   accepting a hierarchical textual file containing structured data elements;
   determining the data attributes associated with corresponding structured data elements of the accepted hierarchical textual file; and
   storing the determined data attributes in the generally tabular data structure of the relational database to preserve a hierarchical aspect of the hierarchical textual file;
   wherein the defining step further comprises establishing the data attribute fields to include a node identifier, a parent node identifier, a tag, a value, and a field type; an object identifier identifying the hierarchical textual file of a particular data element, a node identifier identifying an order of the particular data element with respect to other data elements in the hierarchical textual file, the parent node identifying a rank of the particular data element in a data hierarchy of the hierarchical textual file, a tag identifying a standard label for the particular data element, a value identifying a data value for the tag of the particular data element, and if applicable, a field type identifying a type of data for the value.

8. A method for preparing a hierarchical textual file for storage in a relational database, the method comprising the steps of:
   defining a generally tabular data structure containing data attribute fields and data element fields, wherein the defining step includes specifying a parent node identifier as one of the data attribute fields, the parent node identifier identifying a rank of a particular data element in a data hierarchy applicable to Extensible Mark up Language files;

accepting an Extensible Mark up Language file as the hierarchical textual file containing structured data elements;

determining the data attributes associated with corresponding structured data elements of the accepted hierarchical textual file; and storing the determined data attributes in the generally tabular data structure of the relational database to preserve a hierarchical aspect of the hierarchical textual file.

9. A method for preparing a hierarchical textual file for storage in a relational database, the method comprising the steps of:

defining a generally tabular data structure containing data attribute fields and data element fields, wherein the defining step includes specifying a tag identifying a standard label for a particular data element, specifying a data value for a particular tag of a data element, and specifying a field type identifying the data type for the value;

accepting an Extensible Mark up Language file as the hierarchical textual file containing structured data elements;

determining the data attributes associated with corresponding structured data elements of the accepted hierarchical textual file; and storing the determined data attributes in the generally tabular data structure of the relational database to preserve a hierarchical aspect of the hierarchical textual file.

10. A method for manipulating data associated with a hierarchical textual file, the method comprising the steps of defining a generally tabular data structure containing data attribute fields associated with corresponding data element fields, wherein the defining step includes storing hierarchical attributes as linked lists in columns of the table, different rows of the table associated with different levels of a hierarchy of data objects; at least one row of the table representing one object of data in the hierarchy of the data objects;

accepting a hierarchical textual file containing structured data elements; and determining the data attributes associated with corresponding structured data elements of the accepted hierarchical textual file;

storing the determined data attributes in the generally tabular data structure for storage in the relational database; and processing the structured elements within the table by using standard commands applicable to a relational database environment.

11. The method of claim 10 wherein the defining step defines the data structure to be compatible with standard storage and retrieval operations applicable to the relational database, the hierarchical textual file comprising an Extensible Mark up Language file.

12. The method according to claim 10 wherein the processing step comprises querying the table of the relational database with a standard Structured Query Language command.

13. The method according to claim 10 wherein the processing step comprises manipulating the table of the relational database with a standard Structured Query Language command.

14. The method according to claim 10 further comprising the step of reconstructing the hierarchical textual file from the generally tabular data structure.

15. A system for preparing a hierarchical textual file for storage in a relational database, the system comprising:

a buffer memory for accepting and holding a hierarchical textual file containing structured data elements;

a processor for defining a generally tabular data structure containing data attribute fields associated with corresponding data element fields, the processor adapted to determine the data attributes associated with corresponding structured data elements of the accepted hierarchical textual file; and a storage device coupled to the processor, the storage device storing the determined data attributes in the generally tabular data structure of the relational database, wherein the storage device stores hierarchical attributes as linked lists in columns of the generally tabular data structure, different rows of the generally tabular data structure associated with different levels of a hierarchy of data objects; at least one row of the generally tabular data structure representing one object of data in the hierarchy of the data objects.

* * * * *